United States Patent Office 3,455,653
Patented July 15, 1969

3,455,653
PROCESS FOR THE PRODUCTION OF
TITANIUM DIOXIDE
Victor D. Aftandilian, Watertown, Mass., assignor to
Cabot Corporation, Boston, Mass., a corporation of
Delaware
No Drawing. Filed Mar. 23, 1966, Ser. No. 536,668
Int. Cl. C01g 23; C09c 3/00
U.S. Cl. 23—202                                    9 Claims

ABSTRACT OF THE DISCLOSURE

The use of certain rare earth metals as additives in pyrogenic processes for preparing titanium dioxide pigments having a reduced tendency to coalesce and fuse during the preparation thereof.

---

The present invention relates generally to titanium dioxide pigments and more specifically to a novel method for improving pyrogenic titanium dioxide pigments.

The manufacture of pigment grade titanium dioxide by pyrogenic processes wherein a titanium compound in vapor form is oxidized and/or hydrolyzed at elevated temperatures, i.e. above about 800° C., with the aid of a free oxygen-containing gas is well known. In typical processes of this type, a titanium halide such as titanium tetrachloride is reacted with a free oxygen-containing gas as illustrated in the following equation:

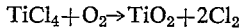
$$TiCl_4 + O_2 \rightarrow TiO_2 + 2Cl_2$$

Since such reactions are normally not self-substaining, auxiliary heat is frequently provided to the reaction zone such as by preheating the reactants and/or the reaction zone. The heat utilized for the preheating of the reaction zone and supply of auxiliary heat thereto during the course of a titanium dioxide producing run is usually provided by reacting a fuel gas with a free oxygen-containing gas as illustrated in the following equation:

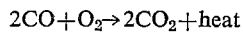
$$2CO + O_2 \rightarrow 2CO_2 + heat$$

In addition to the major reactants, i.e. the titanium compound, free oxygen-containing gas and fuel gas, inert gases are often charged into the reaction zone in order to provide reactant dilution, reactant stream separation, apparatus protection and the like. Moreover, minor amounts of materials which additionally benefit the product and/or reaction are often utilized. Examples of such materials added to the reaction zone in minor amounts are, for instance, nucleating agents such as aluminum chloride, water vapor, hydrogen containing materials, alkali metals and the like. Various combinations of water or water forming substances and alkali metals, particularly potassium have been found to be singularly valuable in the pyrogenic titanium dioxide producing process because the presence of said water/metal combinations results in improvement of the pigment quality of the titanium dioxide product and in higher bulk density and, moreover, allows the use of substantially lower water and oxygen concentrations and maximum throughput without sacrificing pigment quality. This latter consideration is economically important when a titanium halide is the titanium compound feedstock because the presence of water in the reaction zone, although frequently beneficial to product quality, results in by-product hydrogen halide by hydrolysis reaction rather than the readily recoverable and valuable halogen produced when the titanium halide is oxidized.

A serious problem which has plagued the pyrogenic titanium dioxide producing industry resides in the tendency of pyrogenic titanium dioxide to coalesce and fuse during production thereof. Thus, it is often found that instead of a product comprising discrete separate pigment particles, significant numbers of particles are fused together. Said fusion phenomenon is obviously deleterious to the pigmentary quality of the product and contributes to an undesirably lower bulk density product. In accordance with the present invention, however, this problem has been greatly alleviated.

It is a principal object of the present invention to provide novel improvements in pyrogenic titanium dioxide pigment production.

It is another object of the present invention to provide a method for reducing fusion of pyrogenically produced titanium dioxide pigment.

It is still another object of the present invention to provide a novel method for improving the pigmentary quality of pyrogenic titanium dioxide.

Other objects and advantages of the present invention will in part be obvious and will in part appear hereinafter.

In accordance with the present invention it has been discovered that fusion of pyrogenic titanium dioxide can be significantly reduced when pyrogenic titanium dioxide pigment is formed in the presence of a minor amount of certain rare earth metals.

Suitable rare earth metals for the purposes of the present invention are those chosen from the group consisting of lanthanum, neodymiun, samarium, europium, gadolinium and mixtures thereof. The rare earth metal can be utilized in elemental form or in the form of a compound. Generally speaking, the melting points of the elemental rare earth metals are above 900° C.; thus it is normally preferable to utilize the metal in compound form. For instance, inorganic compounds such as the chlorides, bromides, nitrates, oxalates, carbonates, etc., are suitable. Also suitable, however, are organic compounds of the rare earth metals, such as esters, cyclopentadienides and the like. Specific examples of suitable rare earth metal compounds are: lanthanum bromide, lanthanum nitrate, lanthanum oxalate, neodymium acetate, europium ammonium nitrate, samarium carbonate, tricyclopentadienyl neodymium, gadolinium nitrate, gadolinium chloride, europium bromide, and the like. It should be noted that certain rare earth salt mixtures such as didymium salts usually comprise very high concentrations of the above-mentioned rare earth metals. Such mixtures are also generally suitable and can be represent a significant economic advantage over pure rare earth metals or metal compounds. It should be further noted that certain other rare earth metals, such as terbium and praseodymium, form colored oxides, and the presence thereof is therefore normally undesirable in the production of pigment grade titanium dioxide. It is generally important, therefore, that mixtures of rare earth metals or metal compounds contemplated for use in the process of the present inventon be substantially freed from such metals. Moreover, certain anions which can form part of the rare earth metal compound, such as the chromate ion can also impart coloration to the pigment. Thus, rare earth metal compounds comprising such anions should also be normally avoided.

The amount of rare earth metal charged into the titanium dioxide producing reaction zone can vary substantially. Generally speaking, for significant effect to occur, at least about 100 parts by weight of the metal should be charged into the reaction zone for each million parts of titanium dioxide produced. Preferably, at least about 500 parts rare earth metal are utilized per million parts of product. The upper limits of the metal addition are obviously circumscribed only by the amount of residual rare earth metal which can be tolerated in the titanium dioxide pigment.

The method of introduction of the rare earth metal containing material into the reaction zone is generally not critical provided, of course, that said introduction is effected prior to substantial oxidation of the titanium compound. Thus, said material can normally be charged into the reaction zone separately, or as a member of any of the reactant, additive, or inert gas streams. Moreover, said material can be charged as a dispersion or solution thereof. In order to provide good mixing and maintain good quantitative control of the rate of addition, it will normally be preferable to dilute the rare earth metal-containing material prior to charging thereof into the reaction zone.

The objects and advantages of the present invention will be better understood when reference is made to the following example which is illustrative in nature and should not be construed as limiting the scope of the invention.

EXAMPLE

Into a vertical cylindrical reaction chamber having a diameter of about 1.5 feet and a length of about 4 feet and equipped with 3 axial annuli positioned at the top thereof, there is introduced through the outermost annulus about 54 m.$^3$/hr. oxygen and through the middle annulus about 94 m.$^3$/hr. carbon monoxide. The resulting mixture is ignited and the combustion reaction continued until the temperature of the reaction space reaches about 900° C. Next, the oxygen flow is increased to about 86 m.$^3$/hr. and there is charged through the innermost annulus titanium tetrachloride vapor and nitrogen at rates of about 177 kgs./hr. and about 115 m.$^3$/hr. respectively. Additionally there is charged into the titanium tetrachloride/nitrogen stream sufficient sublimed aluminum chloride to provide 1.5 wt. percent alumina on the titanium dioxide produced.

The resulting titanium dioxide product is continuously collected from the bottom of the reaction chamber and it is found that pigmentary titanium dioxide is being produced at a rate of about 57 kgs./hr. The samples of the product are examined by electron micrography and it is found that substantial fusion of the product has occurred. Said fusion is manifested by the presence of chain-like structures comprising between about 6 and about 15 pigment particles. When the pigment product is tested for tinting strength in accordance with ASTM D 322–S7T it is found that the pigment quality is only about 80% of the standard reference.

The reaction was continued under the conditions of the previous paragraph and there is additionally charged into the titanium tetrachloride stream about 50.0 grams/hour of lanthanum chloride. The resulting titanium dioxide pigment product has a tinting strength of about 96% of standard. Moreover, when the pigment is examined by electron microscope it is found that very little fusion has occurred and that those few chain structures found comprised only about 5–7 particles.

When a run is repeated similar to that of the previous paragraph with the exception that an aqueous solution of samarium oxalate is utilized in place of the lanthanum chloride and introduction is effected into the carbon monoxide stream at a rate of about 75 grams/hr. of samarium oxalate substantially the same results occur.

Obviously, many changes can be made in the above example and description without departing from the scope of the invention.

For instance, rare earth metals other than lanthanum chloride and samarium oxalate specifically mentioned such as samarium sulfate, neodymium acetate, gadolinium chloride, europium chloride and the like are also suitable.

The pyrogenic titanium dioxide pigment produced in accordance with the present invention can be treated in any manner normally utilized to treat such pigments. Thus, the pigment can be chemically treated with such materials as triethanolamine or physically treated such as by calcination and/or micronization in order to impart special properties or to render said pigment more suitable for particular applications.

What is claimed is:

1. In a process for the production of titanium dioxide pigments which comprises contacting in an enclosed reaction zone at temperatures above about 800° C. a titanium compound in vapor form with a free oxygen-containing gas the improvement which comprises additionally charging into said reaction zone a material comprising a rare earth metal chosen from the group consisting of lanthanum, neodymium, samarium, europium, gadolinium and mixtures thereof in an amount sufficient to provide at least about 100 parts by weight of said metal per million parts of titanium dioxide pigment produced thereby reducing fusion of the titanium dioxide product.

2. The process of claim 1 wherein the amount of said material introduced into said reaction zone represents at least about 500 parts of said metal per million parts of titanium dioxide pigment produced.

3. The process of claim 1 wherein said material is an inorganic or organic salt.

4. The process of claim 3 wherein said material is a halide.

5. The process of claim 1 wherein said titanium compound is a titanium halide.

6. The process of claim 5 wherein said titanium compound is titanium tetrachloride.

7. The process of claim 1 wherein there is additionally charged into the reaction zone a minor amount of water vapor.

8. The process of claim 1 wherein there is additionally charged into the reaction zone a minor amount of aluminum chloride.

9. The process of claim 1 wherein said material is introduced into the reaction zone in solution.

References Cited

UNITED STATES PATENTS

| | | | |
|---|---|---|---|
| 1,967,235 | 7/1934 | Ferkel | 23—202 |
| 2,211,828 | 8/1940 | Kingsbury et al. | 106—300 |
| 2,462,978 | 3/1949 | Krchma et al. | 23—202 |
| 2,980,509 | 4/1961 | Frey | 23—202 |
| 3,382,042 | 5/1968 | Richardson et al. | 23—202 |

EDWARD STERN, Primary Examiner

U.S. Cl. X.R.

23—21; 106—300